US012537319B2

(12) United States Patent
Henderson

(10) Patent No.: US 12,537,319 B2
(45) Date of Patent: Jan. 27, 2026

(54) ELECTRICAL COUPLING

(71) Applicant: Justin Henderson, Canyon, TX (US)

(72) Inventor: Justin Henderson, Canyon, TX (US)

( * ) Notice: Subject to any disclaimer, the term of this patent is extended or adjusted under 35 U.S.C. 154(b) by 248 days.

(21) Appl. No.: 18/179,009

(22) Filed: Mar. 6, 2023

(65) Prior Publication Data

US 2023/0282989 A1 Sep. 7, 2023

Related U.S. Application Data

(60) Provisional application No. 63/316,651, filed on Mar. 4, 2022.

(51) Int. Cl.

| | |
|---|---|
| ***H01R 4/24*** | (2018.01) |
| ***H01R 4/2408*** | (2018.01) |
| ***H01R 4/50*** | (2006.01) |
| ***H01R 11/12*** | (2006.01) |

(52) U.S. Cl.

CPC ......... *H01R 4/2408* (2013.01); *H01R 4/5016* (2013.01); *H01R 11/12* (2013.01)

(58) Field of Classification Search

None

See application file for complete search history.

(56) References Cited

U.S. PATENT DOCUMENTS

| | | | |
|---|---|---|---|
| 2,792,560 A * | 5/1957 | Bollmeier ................ | H01R 4/14 403/372 |
| 3,015,509 A * | 1/1962 | Bollmeier ................ | H01R 4/22 403/307 |
| 5,579,575 A * | 12/1996 | Lamome ................ | H01R 4/723 219/605 |
| 5,842,894 A | 12/1998 | Mehlberg | |
| 5,975,939 A * | 11/1999 | Market .................... | H01R 4/22 439/433 |
| 2007/0264861 A1 | 11/2007 | Scheuermann et al. | |
| 2014/0287612 A1 | 9/2014 | Frenken | |
| 2019/0165497 A1 | 5/2019 | Toivanen et al. | |

* cited by examiner

*Primary Examiner* — Ross N Gushi

(74) *Attorney, Agent, or Firm* — Shannon Warren

(57) ABSTRACT

An electrical coupling for making a secure and reliable connection between a frayed end of one or more wires. The electrical coupling comprises a terminal, a casing, a conical portion, and a threading portion. The electrical coupling is configured to receive and squeeze down the frayed end of the one or more wires due to the tapering and narrowing shape of the conical portion within an inner sidewall between a first inner diameter and a second inner diameter. The conical portion comprises a side wall. The side wall is configured to taper in from a first end to a second end to form a conical shape. The conical portion comprises a first open end having the first inner diameter.

5 Claims, 8 Drawing Sheets

ELECTRICAL COUPLING

CROSS-REFERENCE TO RELATED APPLICATIONS

This application claims benefit to and incorporates by reference U.S. provisional patent application No. 63/316,651 filed on 2022 Mar. 4.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

Examples of cable lugs can be found in US20140287612A1, U.S. Pat. No. 5,842,894A, US20070264861A1, and US20190165497A1. However, no combination of prior art is known to the application to present a challenge to the patent eligibility of the current application.

BRIEF SUMMARY OF THE INVENTION

An electrical coupling for making a secure and reliable connection between a frayed end of one or more wires. Said electrical coupling comprises a terminal, a casing, a conical portion, and a threading portion. Said electrical coupling is configured to receive and squeeze down said frayed end of said one or more wires due to the tapering and narrowing shape of said conical portion within an inner sidewall between a first inner diameter and a second inner diameter. Said conical portion comprises a side wall. Said side wall is configured to taper in from a first end to a second end to form a conical shape. Said conical portion comprises a first open end having said first inner diameter. Said conical portion is configured to receive said frayed end of said one or more wires into said first open end at said first end for electrical connection with said terminal. A first end of said terminal is configured to connect with said second end of said conical portion. Said conical portion, said threading portion and said terminal are conductive and configured to transmit electricity from a portion of said conical portion to a terminal head. Said conical portion comprises an enclosed conical portion. Said enclosed conical portion comprises an enclosed second end. Said enclosed second end of said enclosed conical portion is configured to enclose and interface with said frayed end of said one or more wires. Said first end of said terminal is configured to attach to a portion of said enclosed second end of said enclosed conical portion. Said threading portion is configured to attach to said inner sidewall of said conical portion. Both said conical portion and said threading portion comprise a conductive material.

Said electrical coupling for making a secure and reliable connection between said frayed end of said one or more wires. Said electrical coupling comprises said terminal, said casing, said conical portion, and said threading portion. Said electrical coupling is configured to receive and squeeze down said frayed end of said one or more wires due to the tapering and narrowing shape of said conical portion within said inner sidewall between said first inner diameter and said second inner diameter. Said conical portion comprises said side wall. Said side wall is configured to taper in from said first end to said second end to form a conical shape. Said conical portion comprises said first open end having said first inner diameter. Said conical portion is configured to receive said frayed end of said one or more wires into said first open end at said first end for electrical connection with said terminal. Said first end of said terminal is configured to connect with said second end of said conical portion. Said conical portion, said threading portion and said terminal are conductive and configured to transmit electricity from a portion of said conical portion to said terminal head.

Said electrical coupling for making a secure and reliable connection between said frayed end of said one or more wires. Said electrical coupling comprises said terminal, said casing, said conical portion, and said threading portion. Said electrical coupling is configured to receive and squeeze down said frayed end of said one or more wires due to the tapering and narrowing shape of said conical portion within said inner sidewall between said first inner diameter and said second inner diameter. Said conical portion comprises said side wall. Said side wall is configured to taper in from said first end to said second end to form a conical shape. Said conical portion comprises said first open end having said first inner diameter. Said conical portion is configured to receive said frayed end of said one or more wires into said first open end at said first end for electrical connection with said terminal. Said first end of said terminal is configured to connect with said second end of said conical portion. Said conical portion, said threading portion and said terminal are conductive and configured to transmit electricity from a portion of said conical portion to said terminal head. Said threading portion is configured to attach to said inner sidewall of said conical portion. Both said conical portion and said threading portion comprise a conductive material. Said threading portion is bonded into said conical portion. Said threading portion is loosely fit within said inner sidewall. Said terminal comprises said terminal head, said first end and a terminal aperture. Said casing comprises a non-conductive material.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
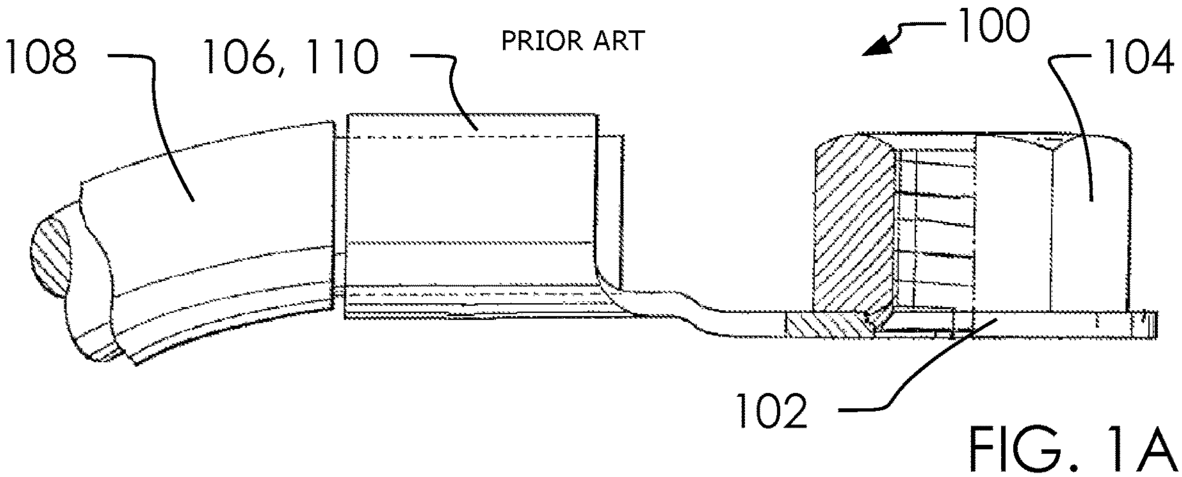
FIGS. 1A, 1B and 1C illustrate various embodiments of a prior art cable lug 100.
Figure 1B:
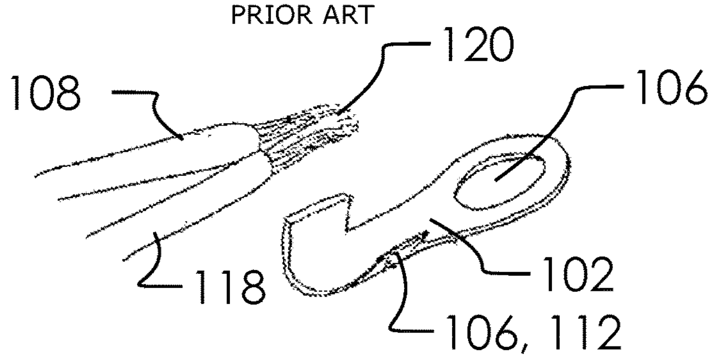
Figure 1C:
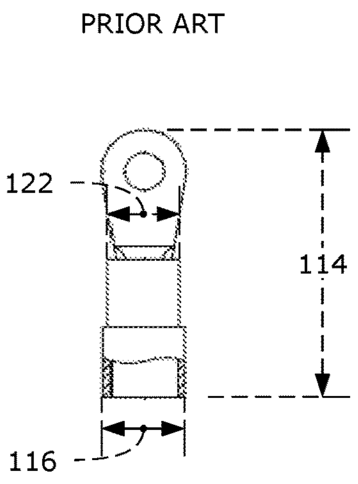

FIGS. 1A, 1B and 1C illustrate various embodiments of a prior art cable lug 100.

In one embodiment, said prior art cable lug 100 can comprise a contact plate 102, a nut 104, a clamping portion 106, and a cable 108. In one embodiment, said clamping portion 106 can comprise an enclosed embodiment 110, and a butterfly embodiment 112.

In one embodiment, said cable 108 can comprise a plurality of cables as illustrated in FIG. 1B. Further, said cable 108 can comprise a nonconductive exterior 118 and a conductive interior 120, as is known in the art.

Finally, as known in the art, said clamping portion 106 can comprise a height 114 and a first diameter 116 and a second diameter 122, as illustrated in FIG. 1C. accordingly, said clamping portion 106 is known to taper in steps, as illustrated.

Figure 2A:
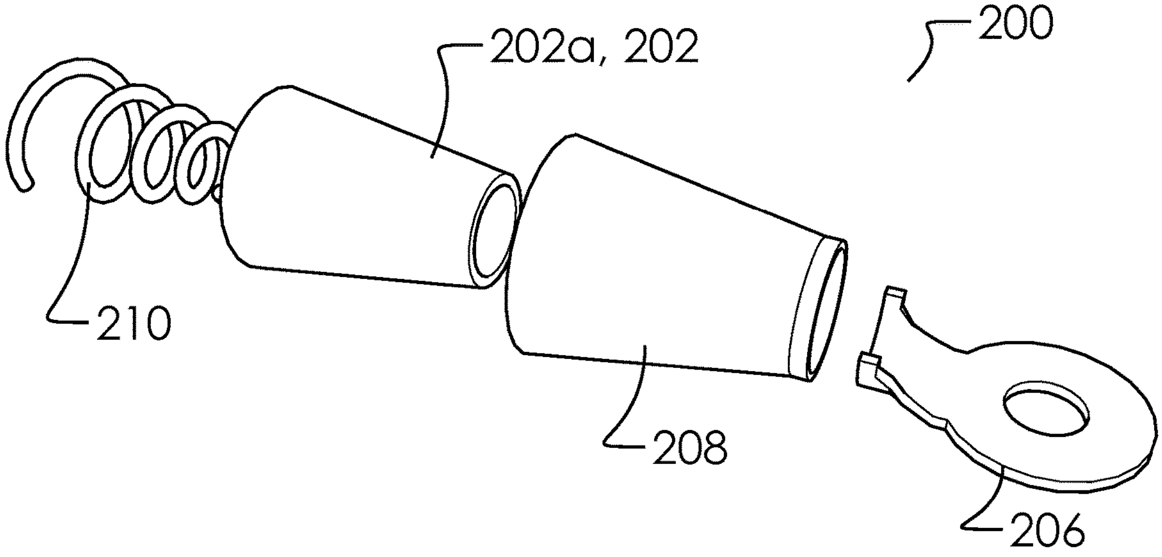
FIGS. 2A, and 2B illustrate an exploded perspective overview of an electrical coupling 200 comprising an open conical portion 202*a* and an enclosed conical portion 202*b*.
Figure 2B:
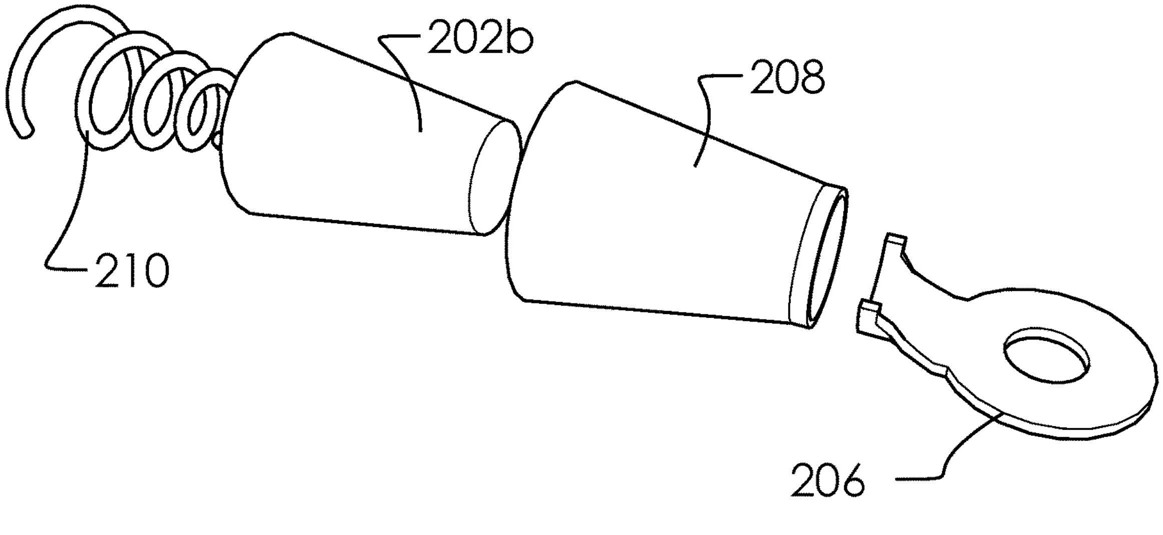

FIGS. 2A, and 2B illustrate an exploded perspective overview of an electrical coupling 200 comprising an open conical portion 202*a* and an enclosed conical portion 202*b*.

In one embodiment, said electrical coupling 200 can comprise a terminal 206, a casing 208, a conical portion 202, and a threading portion 210.

In one embodiment, said conical portion 202 can comprise either said open conical portion 202*a* or said enclosed conical portion 202*b*.

Figure 3A:
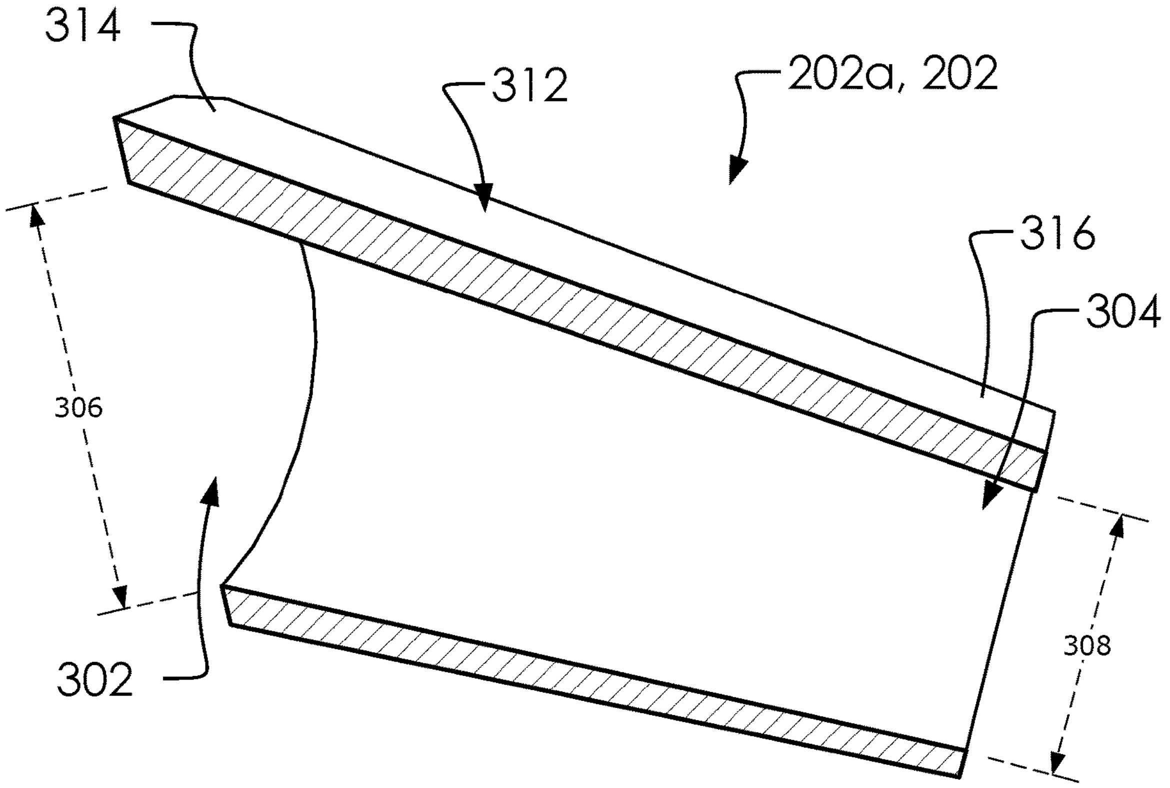
FIGS. 3A, and 3B illustrate a cross-section perspective overview of said open conical portion 202*a* and said enclosed conical portion 202*b*, respectively.
Figure 3B:
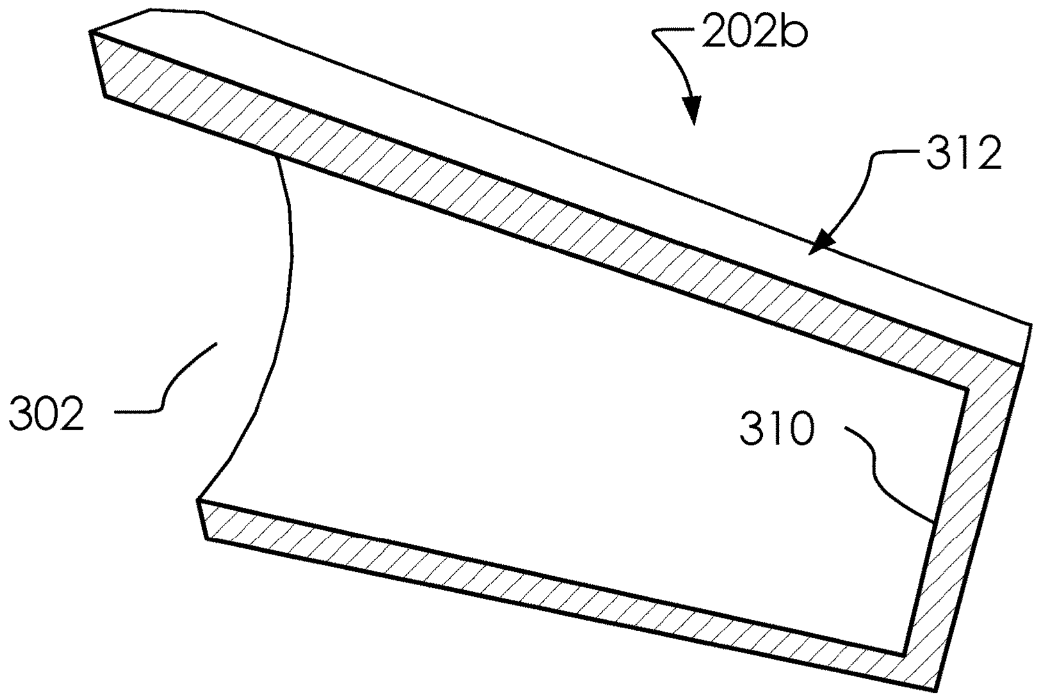

FIGS. 3A, and 3B illustrate a cross-section perspective overview of said open conical portion 202*a* and said enclosed conical portion 202*b*, respectively.

In one embodiment, said conical portion 202 can comprise a side wall 312. Wherein, said side wall 312 can taper in from a first end 314 to a second end 316 to form a conical shape. Said conical portion 202 can comprise a first open end 302 having a first inner diameter 306. Said conical portion 202 can be configured to receive one or more wires into said first open end 302 at said first end 314 for electrical connection with said terminal 206.

In one embodiment, said conical portion 202 can comprise said open conical portion 202*a*. Wherein, said open conical portion 202*a* can comprise a second open end 304 having a second inner diameter 308.

In one embodiment, said conical portion 202 can comprise said enclosed conical portion 202*b*. wherein, said enclosed conical portion 202*b* can comprise an enclosed second end 310.

Figure 4:
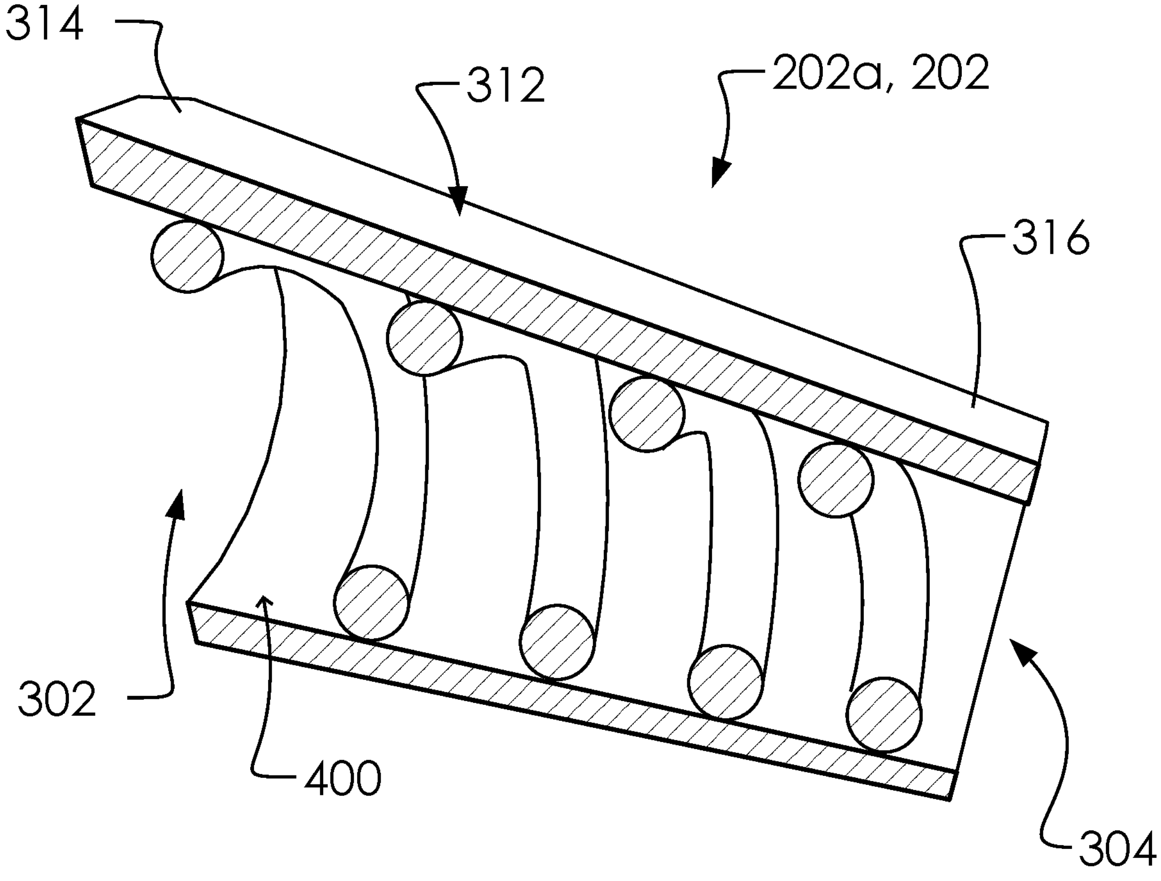
FIG. 4 illustrates a cross-section perspective overview of said open conical portion 202*a* with a threading portion 210.

FIG. 4 illustrates a cross-section perspective overview of said open conical portion 202*a* with said threading portion 210.

In one embodiment, said threading portion 210 can attach to an inner sidewall 400 of said conical portion 202, as illustrated. In one embodiment, both said conical portion 202 and said threading portion 210 can comprise a conductive material, such as metal, as is known in the art. In one embodiment, said threading portion 210 can be bonded into said conical portion 202 or loosely fit within said inner sidewall 400.

In one embodiment, said threading portion 210 can attach within said open conical portion 202*a* and said enclosed conical portion 202*b* as illustrated and discussed in FIG. 4.

Figure 5A:
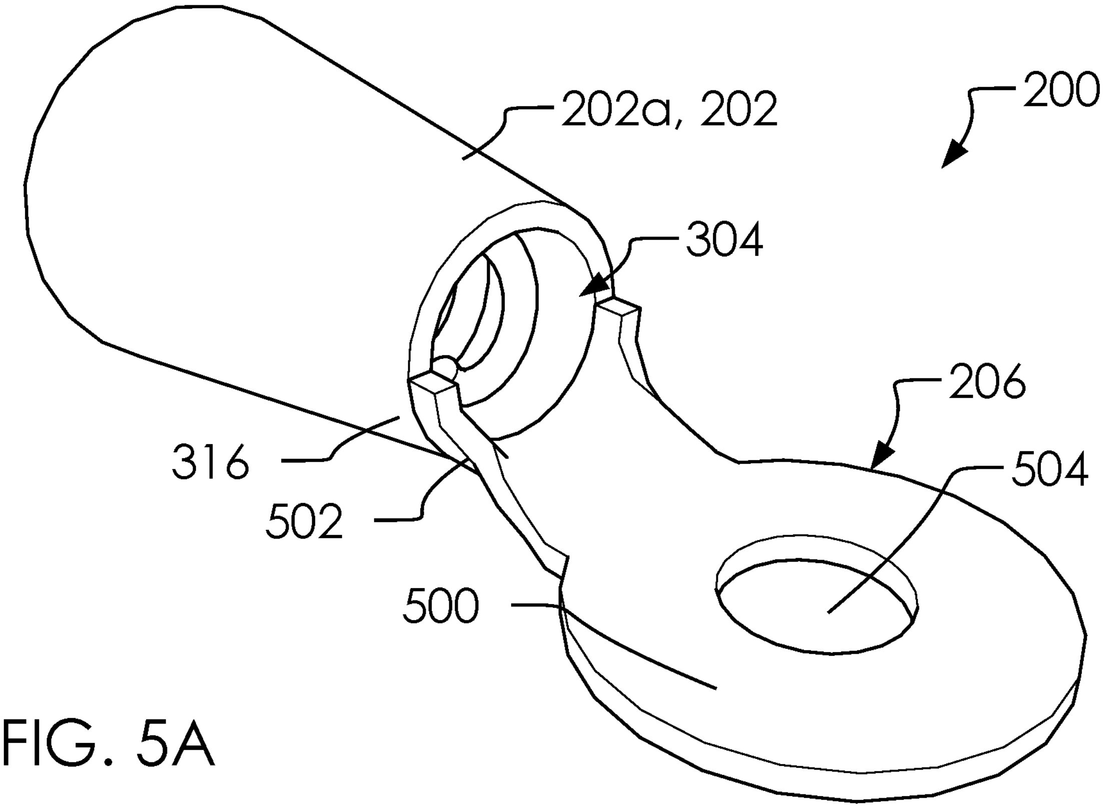
FIGS. 5A, and 5B illustrate a perspective overview of a terminal 206 and said threading portion 210 with said open conical portion 202*a* and said enclosed conical portion 202*b*, respectively.
Figure 5B:
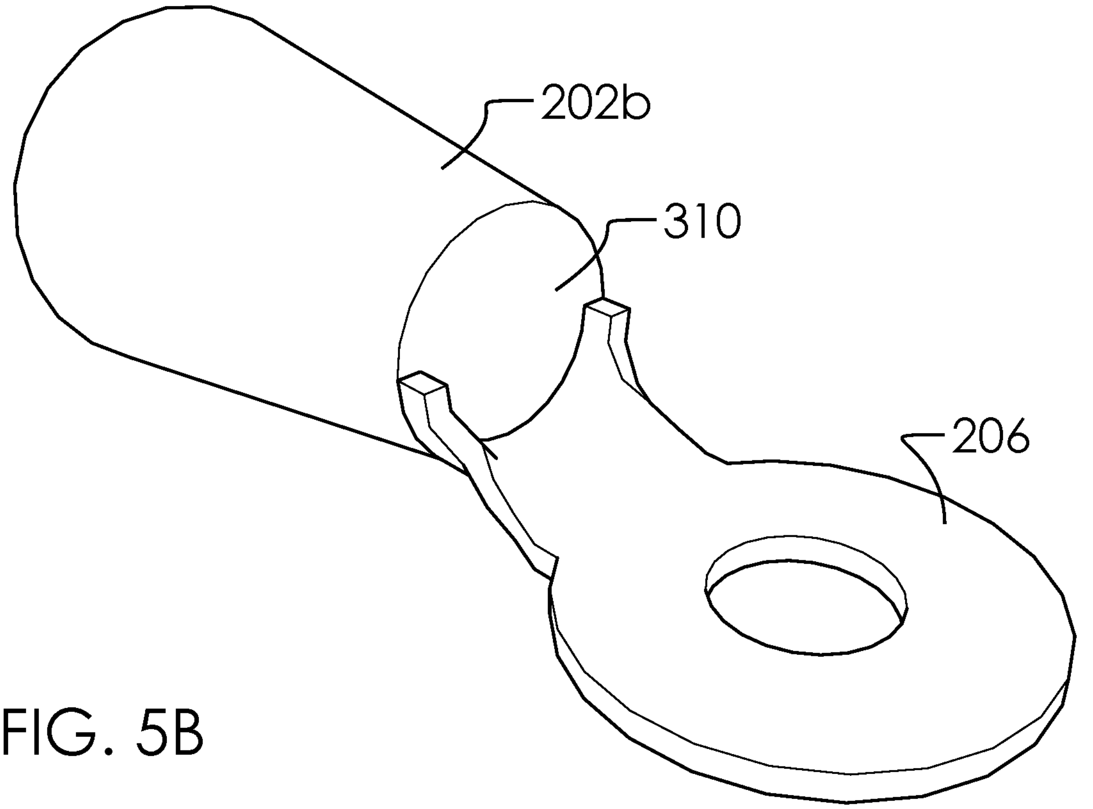

FIGS. 5A, and 5B illustrate a perspective overview of said terminal 206 and said threading portion 210 with said open conical portion 202*a* and said enclosed conical portion 202*b*, respectively.

In one embodiment, said terminal 206 can comprise a terminal head 500, a first end 502 and a terminal aperture 504. In one embodiment, said first end 502 of said terminal 206 can connect with said second end 316 of said conical portion 202. Wherein, said conical portion 202, said threading portion 210 and said terminal 206 can be conductive and configured to transmit electricity from a portion of said conical portion 202 to said terminal head 500.

In one embodiment, said first end 502 of said terminal 206 can attach around a portion of said second open end 304 of said open conical portion 202*a*.

In one embodiment, said first end 502 of said terminal 206 can attach to a portion of said enclosed second end 310 of said enclosed conical portion 202*b*.

Figure 6A:
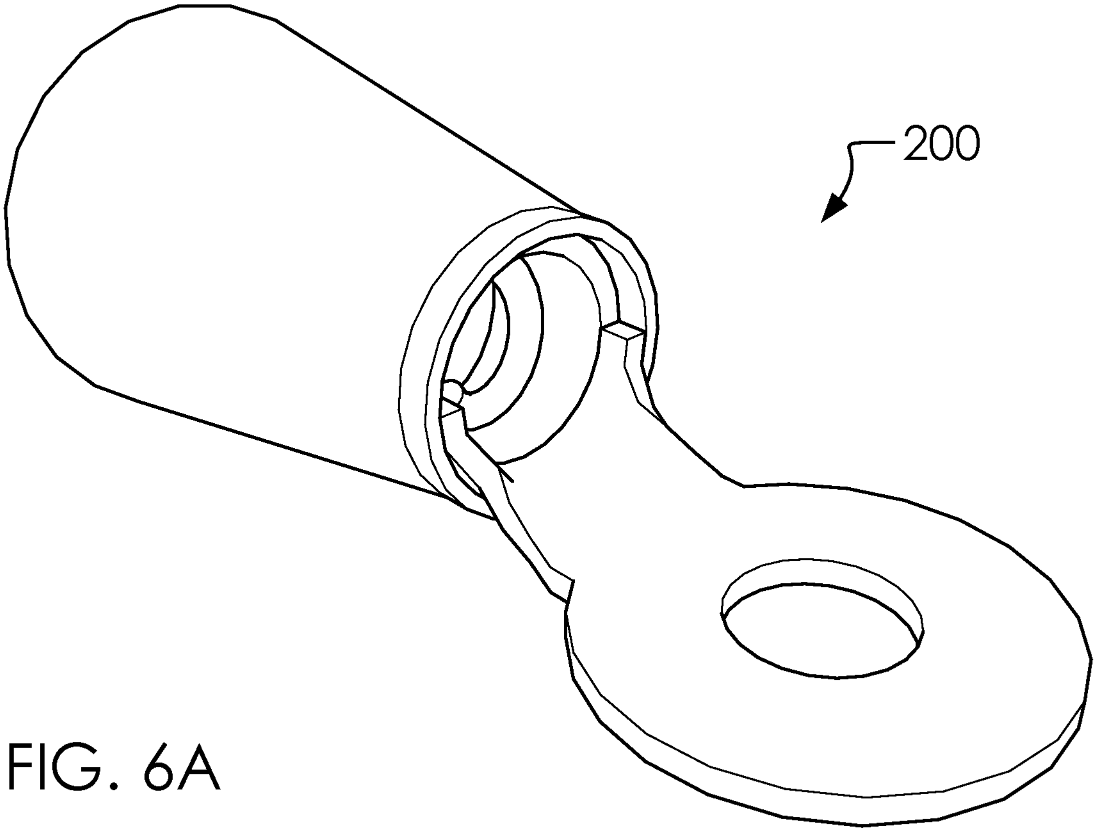
FIGS. 6A, and 6B illustrate a perspective overview of said electrical coupling 200 with said open conical portion 202*a* and said enclosed conical portion 202*b*, respectively.
Figure 6B:
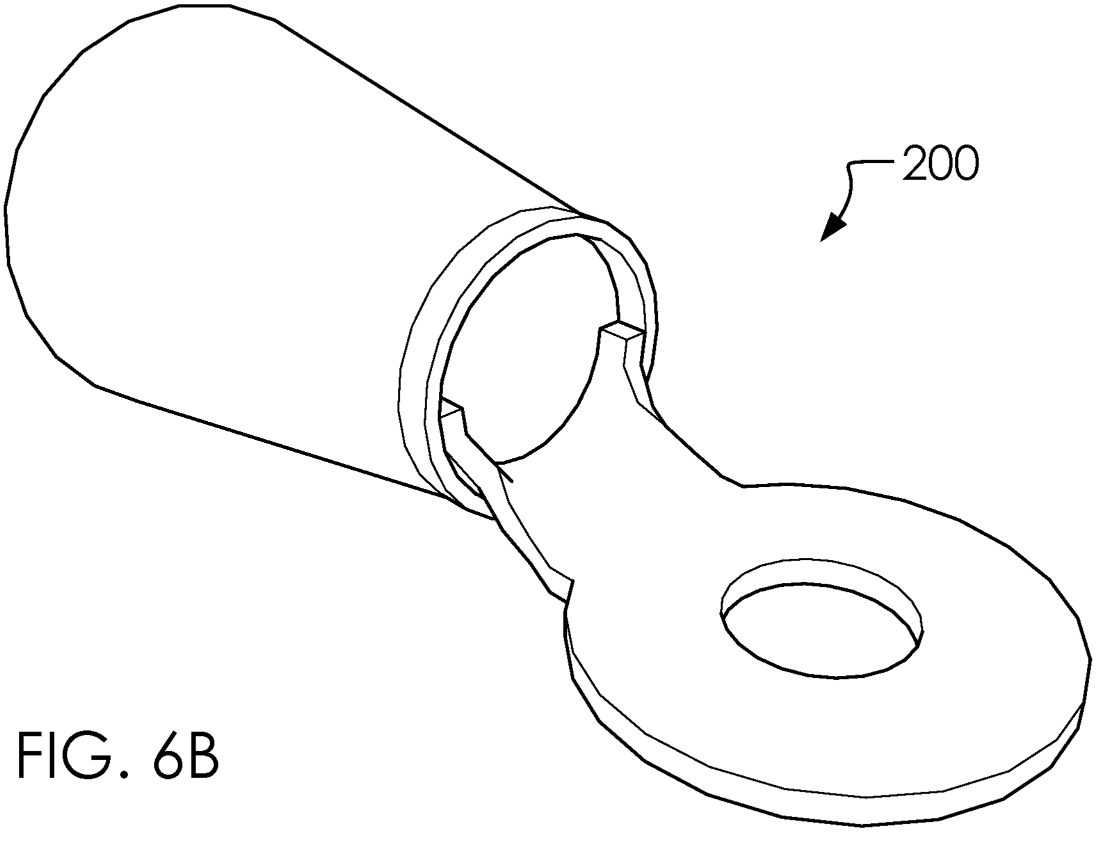

FIGS. 6A, and 6B illustrate a perspective overview of said electrical coupling 200 with said open conical portion 202*a* and said enclosed conical portion 202*b*, respectively.

In one embodiment, said casing 208 can comprise a non-conductive material.

Figure 7:
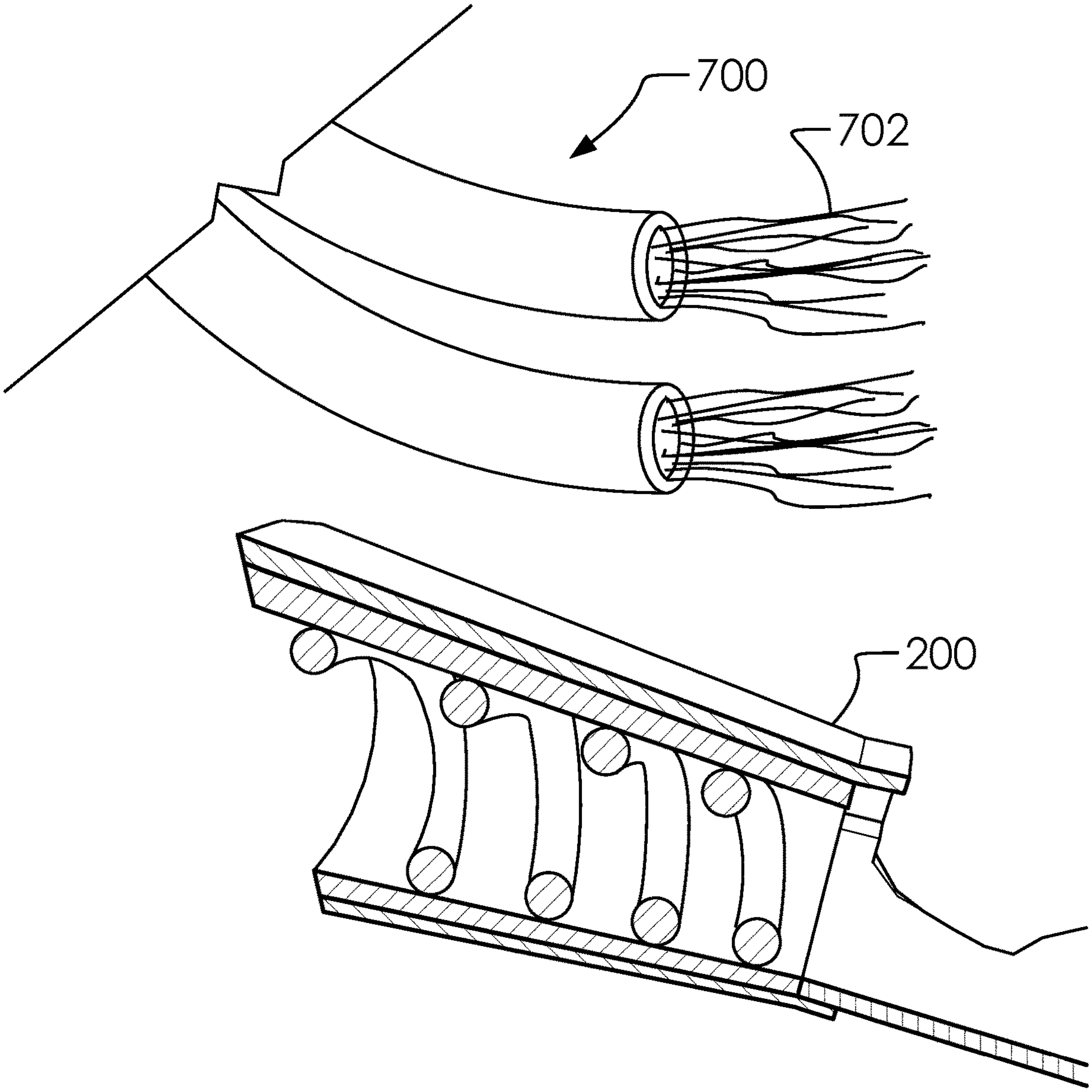
FIG. 7 illustrates one or more wires 700 with said electrical coupling 200 with said one or more wires 700 outside of said electrical coupling 200.

FIG. 7 illustrates one or more wires 700 with said electrical coupling 200 with said one or more wires 700 outside of said electrical coupling 200.

Figure 8:
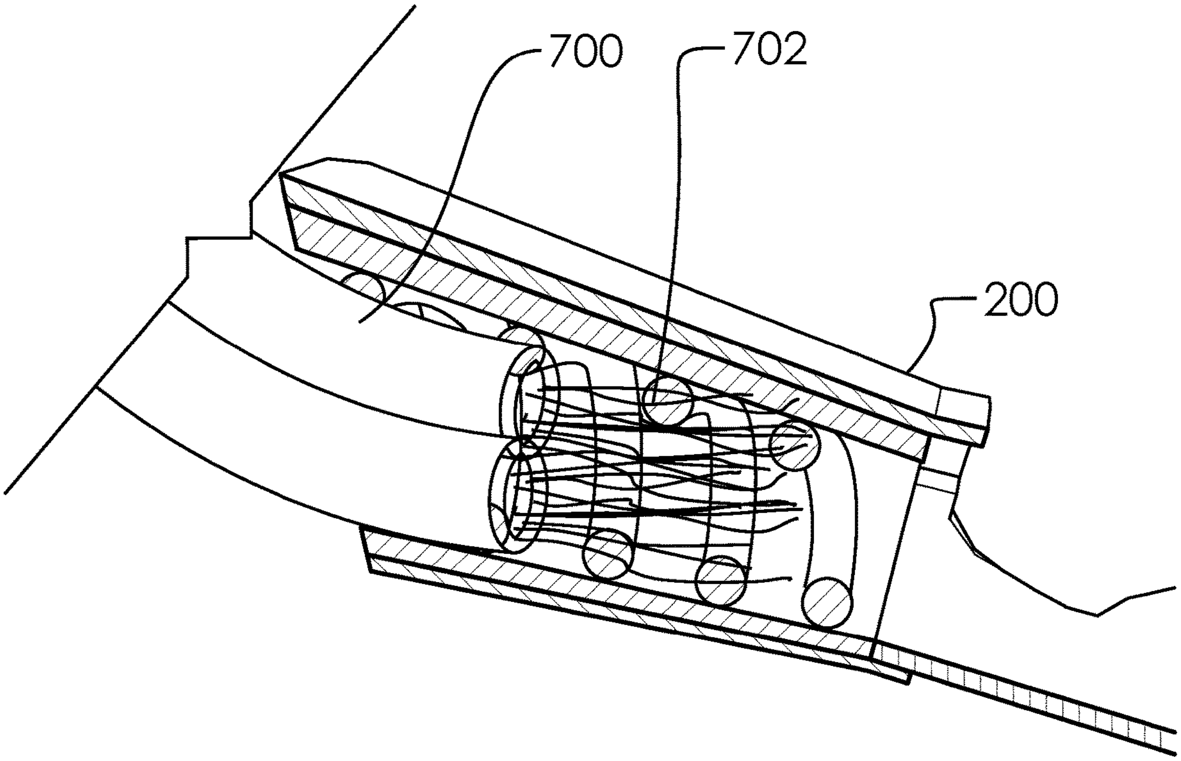
FIG. 8 illustrates said one or more wires 700 with said electrical coupling 200 with said one or more wires 700 inside of said electrical coupling 200.

FIG. 8 illustrates said one or more wires 700 with said electrical coupling 200 with said one or more wires 700 inside of said electrical coupling 200.

In one embodiment, said electrical coupling 200 can be configured to receive and squeeze down a frayed end 702 of said one or more wires 700 due to the tapering and narrowing shape of said conical portion 202 within said inner sidewall 400 between said first inner diameter 306 and said second inner diameter 308.

One advantage of said enclosed second end 310 of said enclosed conical portion 202*b* can comprise an additional and likely surface to touch said frayed end 702 of said one or more wires 700.

In one embodiment, said electrical coupling 200 can be used in conjunction with solder.

In one embodiment, said conical portion 202 can be smashed to further enclose and secure said frayed end 702 within said conical portion 202.

The following sentences comprise a summary of the original claims and can be considered a preferred embodiment of the current disclosure.

Said electrical coupling 200 for making a secure and reliable connection between said frayed end 702 of said one or more wires 700. Said electrical coupling 200 comprises said terminal 206, said casing 208, said conical portion 202, and said threading portion 210. Said electrical coupling 200 can be configured to receive and squeeze down said frayed end 702 of said one or more wires 700 due to the tapering and narrowing shape of said conical portion 202 within said inner sidewall 400 between said first inner diameter 306 and said second inner diameter 308. Said conical portion 202 comprises said side wall 312. Said side wall 312 can be configured to taper in from said first end 314 to said second end 316 to form a conical shape. Said conical portion 202 comprises said first open end 302 having said first inner diameter 306. Said conical portion 202 can be configured to receive said frayed end 702 of said one or more wires 700 into said first open end 302 at said first end 314 for electrical connection with said terminal 206. Said first end 502 of said terminal 206 can be configured to connect with said second end 316 of said conical portion 202. Said conical portion 202, said threading portion 210 and said terminal 206 can be conductive and configured to transmit electricity from a portion of said conical portion 202 to said terminal head 500. Said conical portion 202 comprises said enclosed conical portion 202*b*. Wherein, said enclosed conical portion 202*b* comprises said enclosed second end 310. Said enclosed second end 310 of said enclosed conical portion 202*b* is configured to enclose and interface with said frayed end 702 of said one or more wires 700. Said first end 502 of said terminal 206 can be configured to attach to a portion of said enclosed second end 310 of said enclosed conical portion 202*b*. Said threading portion 210 can be configured to attach to said inner sidewall 400 of said conical portion 202. Both said conical portion 202 and said threading portion 210 comprise a conductive material.

Said electrical coupling 200 for making a secure and reliable connection between said frayed end 702 of said one or more wires 700. Said electrical coupling 200 comprises said terminal 206, said casing 208, said conical portion 202, and said threading portion 210. Said electrical coupling 200 can be configured to receive and squeeze down said frayed end 702 of said one or more wires 700 due to the tapering and narrowing shape of said conical portion 202 within said inner sidewall 400 between said first inner diameter 306 and said second inner diameter 308. Said conical portion 202 comprises said side wall 312. Said side wall 312 can be configured to taper in from said first end 314 to said second end 316 to form a conical shape. Said conical portion 202 comprises said first open end 302 having said first inner diameter 306. Said conical portion 202 can be configured to receive said frayed end 702 of said one or more wires 700 into said first open end 302 at said first end 314 for electrical connection with said terminal 206. Said first end 502 of said terminal 206 can be configured to connect with said second end 316 of said conical portion 202. Said conical portion 202, said threading portion 210 and said terminal 206 can be conductive and configured to transmit electricity from a portion of said conical portion 202 to said terminal head 500.

Said conical portion 202 comprises said open conical portion 202*a*. Said open conical portion 202*a* comprises said second open end 304 having said second inner diameter 308.

Said first end 502 of said terminal 206 can be configured to attach around a portion of said second open end 304 of said open conical portion 202*a*.

Said conical portion 202 comprises said enclosed conical portion 202*b*. Wherein, said enclosed conical portion 202*b* comprises said enclosed second end 310.

Said enclosed second end 310 of said enclosed conical portion 202*b* is configured to enclose and interface with said frayed end 702 of said one or more wires 700.

Said first end 502 of said terminal 206 can be configured to attach to a portion of said enclosed second end 310 of said enclosed conical portion 202*b*.

Said threading portion 210 can be configured to attach to said inner sidewall 400 of said conical portion 202. Both said conical portion 202 and said threading portion 210 comprise a conductive material.

Said threading portion 210 can be bonded into said conical portion 202.

Said threading portion 210 can be loosely fit within said inner sidewall 400.

Said terminal 206 can comprise said terminal head 500, said first end 502 and said terminal aperture 504.

Said casing 208 can comprise a non-conductive material.

Said electrical coupling 200 for making a secure and reliable connection between said frayed end 702 of said one or more wires 700. Said electrical coupling 200 comprises said terminal 206, said casing 208, said conical portion 202, and said threading portion 210. Said electrical coupling 200 can be configured to receive and squeeze down said frayed end 702 of said one or more wires 700 due to the tapering and narrowing shape of said conical portion 202 within said inner sidewall 400 between said first inner diameter 306 and said second inner diameter 308. Said conical portion 202 comprises said side wall 312. Said side wall 312 can be configured to taper in from said first end 314 to said second end 316 to form a conical shape. Said conical portion 202 comprises said first open end 302 having said first inner diameter 306. Said conical portion 202 can be configured to receive said frayed end 702 of said one or more wires 700 into said first open end 302 at said first end 314 for electrical connection with said terminal 206. Said first end 502 of said terminal 206 can be configured to connect with said second end 316 of said conical portion 202. Said conical portion 202, said threading portion 210 and said terminal 206 can be conductive and configured to transmit electricity from a portion of said conical portion 202 to said terminal head 500. Said threading portion 210 can be configured to attach to said inner sidewall 400 of said conical portion 202. Both said conical portion 202 and said threading portion 210 comprise a conductive material. Said threading portion 210 can be bonded into said conical portion 202. Said threading portion 210 can be loosely fit within said inner sidewall 400. Said terminal 206 comprises said terminal head 500, said first end 502 and said terminal aperture 504. Said casing 208 comprises a non-conductive material.

The following listing of the parts in the figures is provided for the convenience of the reader.

Said prior art cable lug 100,
said contact plate 102,
said nut 104,
said clamping portion 106,
said cable 108,
said enclosed embodiment 110,
said butterfly embodiment 112,
said height 114,
said first diameter 116,
said nonconductive exterior 118,
said conductive interior 120,
said second diameter 122,
said electrical coupling 200,
said conical portion 202,
said open conical portion 202*a*,
said enclosed conical portion 202*b*, said terminal 206,
said casing 208,
said threading portion 210,
said first open end 302,
said second open end 304,
said first inner diameter 306,
said second inner diameter 308,
said enclosed second end 310,
said side wall 312,
said first end 314,
said second end 316,
said inner sidewall 400,
said terminal head 500,
said first end 502,
said terminal aperture 504,
said one or more wires 700 and
said frayed end 702.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An electrical coupling for making a secure and reliable connection between a frayed end of one or more wires, wherein:
- said electrical coupling comprises a terminal, a casing, a conical portion, and a threading portion;
- said electrical coupling is configured to receive and squeeze down said frayed end of said one or more wires due to the tapering and narrowing shape of said conical portion within an inner sidewall between a first inner diameter and a second inner diameter;
- said conical portion comprises a side wall;
- said side wall is configured to taper in from a first end to a second end to form a conical shape;
- wherein said conical portion is integrally formed with a smooth, continuous tapering sidewall free of bends, steps, or segmented prongs;
- said conical portion comprises a first open end having said first inner diameter;
- said conical portion is configured to receive said frayed end of said one or more wires into said first open end at said first end for electrical connection with said terminal;
- a first end of said terminal is configured to connect with said second end of said conical portion;
- said conical portion, said threading portion and said terminal are conductive and configured to transmit electricity from a portion of said conical portion to a terminal head;
- said conical portion comprises an enclosed conical portion;
- wherein, said enclosed conical portion comprises an enclosed second end;
- said enclosed second end fully caps and directly contacts the frayed ends of said one or more wires;
- said first end of said terminal is configured to attach to a portion of said enclosed second end of said enclosed conical portion;
- said threading portion is configured to attach to said inner sidewall of said conical portion;
- wherein said threading portion is helically bonded or press-fit to said inner sidewall of said conical portion;
- wherein said threading portion is bonded into said conical portion; and
- both said conical portion and said threading portion comprise a conductive material.

2. An electrical coupling for making a secure and reliable connection between a frayed end of one or more wires, wherein:
- said electrical coupling comprises a terminal, a casing, a conical portion, and a threading portion;
- said electrical coupling is configured to receive and squeeze down said frayed end of said one or more wires due to the tapering and narrowing shape of said conical portion within an inner sidewall between a first inner diameter and a second inner diameter;
- said conical portion comprises a side wall;
- said side wall is configured to taper in from a first end to a second end to form a conical shape;
- wherein said conical portion is integrally formed with a smooth, continuous tapering sidewall free of bends, steps, or segmented prongs;
- said conical portion comprises a first open end having said first inner diameter;
- said conical portion is configured to receive said frayed end of said one or more wires into said first open end at said first end for electrical connection with said terminal;
- wherein said threading portion is helically bonded or press-fit to said inner sidewall of said conical portion;
- wherein said threading portion is bonded into said conical portion; and
- both said conical portion and said threading portion comprise a conductive material.

3. The electrical coupling of claim 2, wherein:
- said terminal comprises said terminal head, said first end and a terminal aperture.

4. The electrical coupling of claim 2, wherein:
- said casing comprises a non-conductive material.

5. An electrical coupling for making a secure and reliable connection between a frayed end of one or more wires, wherein:
- said electrical coupling comprises a terminal, a casing, a conical portion, and a threading portion;
- said electrical coupling is configured to receive and squeeze down said frayed end of said one or more wires due to the tapering and narrowing shape of said conical portion within an inner sidewall between a first inner diameter and a second inner diameter;
- said conical portion comprises a side wall;
- said side wall is configured to taper in from a first end to a second end to form a conical shape;
- wherein said conical portion is integrally formed with a smooth, continuous tapering sidewall free of bends, steps, or segmented prongs;
- said conical portion comprises a first open end having said first inner diameter;

said conical portion is configured to receive said frayed end of said one or more wires into said first open end at said first end for electrical connection with said terminal;

a first end of said terminal is configured to connect with said second end of said conical portion;

said conical portion, said threading portion and said terminal are conductive and configured to transmit electricity from a portion of said conical portion to a terminal head;

said threading portion is configured to attach to said inner sidewall of said conical portion;

wherein said threading portion is helically bonded or press-fit to said inner sidewall of said conical portion;

both said conical portion and said threading portion comprise a conductive material;

said threading portion is bonded into said conical portion;

said threading portion is loosely fit within said inner sidewall;

said terminal comprises said terminal head, said first end and a terminal aperture;

said casing comprises a non-conductive material;

wherein an enclosed second end fully caps and directly contacts the frayed ends of said one or more wires.

* * * * *